(12) United States Patent
Schwenk

(10) Patent No.: US 7,162,037 B1
(45) Date of Patent: Jan. 9, 2007

(54) METHOD FOR GENERATING/REGENERATING AN ENCRYPTION KEY FOR A CRYPTOGRAPHIC METHOD

(75) Inventor: Joerg Schwenk, Dieburg (DE)

(73) Assignee: Deutsche Telekom AG, Bonn (DE)

( * ) Notice: Subject to any disclaimer, the term of this patent is extended or adjusted under 35 U.S.C. 154(b) by 752 days.

(21) Appl. No.: 10/049,258

(22) PCT Filed: Jul. 6, 2000

(86) PCT No.: PCT/EP00/06387

§ 371 (c)(1),
(2), (4) Date: May 22, 2002

(87) PCT Pub. No.: WO01/08347

PCT Pub. Date: Feb. 1, 2001

(30) Foreign Application Priority Data

Jul. 27, 1999 (DE) ................................ 199 35 285

(51) Int. Cl.
*H04L 9/00* (2006.01)
(52) U.S. Cl. ........................................ 380/286; 380/44
(58) Field of Classification Search ................ 380/44, 380/286, 278, 279, 262; 713/171
See application file for complete search history.

(56) References Cited

U.S. PATENT DOCUMENTS

| 4,736,423 A | | 4/1988 | Matyas | |
|---|---|---|---|---|
| 4,947,430 A | * | 8/1990 | Chaum | 713/180 |
| 5,201,000 A | * | 4/1993 | Matyas et al. | 380/30 |
| 5,321,749 A | * | 6/1994 | Virga | 380/243 |
| 5,647,000 A | * | 7/1997 | Leighton | 380/30 |
| 5,937,066 A | * | 8/1999 | Gennaro et al. | 380/286 |
| 6,148,404 A | * | 11/2000 | Yatsukawa | 713/200 |
| 6,345,098 B1 | * | 2/2002 | Matyas, Jr. et al. | 380/46 |

FOREIGN PATENT DOCUMENTS

DE 36 31 797 3/1988

OTHER PUBLICATIONS

"SSL 3.0 Specification" Freier et al., Netscape Communications, 1996.*
Maher, D.P., "Cryptobackup and Key Escrow," Communications of the Association for Computing Machinery, US, Association for Computing Machinery, New York, vol. 39, No. 3, Mar. 1, 1996, pp. 48-53.
Menezes, A.J. et al., "Handbook of Applied Cryptography," 1997, CRC Press, USA, pp. 130, 524-525.

* cited by examiner

Primary Examiner—Kambiz Zand
Assistant Examiner—Thomas Ho
(74) Attorney, Agent, or Firm—Kenyon & Kenyon LLP

(57) ABSTRACT

A method for generating/regenerating an encryption key for a cryptographic method including the encryption key as well as a public key being generated using a predefined deterministic method from a large random number (seed), where the seed is only generated on the user side, and for which quantities available only to the user are consulted. Regeneration information (R), which is suitable for regenerating the seed and from which the seed is able to be derived deterministically by the trust center by linking only to information known to it, may be generated on the user side and stored so as to be secured against lost. In the event of loss of the encryption key, the seed may be reconstructed by the trust center by linking the regeneration information to the secret information.

8 Claims, 1 Drawing Sheet

N      Ü      V g, p      g, v, p $g^v$ modulo p  ←————— $V = g^v$ modulo p u $S = (g^v)^u$ modulo p $\xrightarrow{det}$ C, U $R = g^U$ modulo p u, S

METHOD FOR GENERATING/REGENERATING AN ENCRYPTION KEY FOR A CRYPTOGRAPHIC METHOD

FIELD OF THE INVENTION

The present invention relates to a method for generating and/or regenerating an encryption key for a cryptographic method. Specifically, the present invention relates to providing and using the encryption key, as well as a public key being generated using a predefined deterministic method, from a large random number (seed).

BACKGROUND INFORMATION

The cryptographic technique of encryption to secure communications data and stored data appears to be employed more often. In this context, the data are enciphered (or encrypted) under the control of a cryptographic key. The data can also be deciphered again using the same key. Marketable products and software libraries may be available for this purpose.

In encryption operations, a so-called hybrid method may be used. In this method, the actual message is encrypted using a randomly selected symmetric key or session key and a preselected symmetric encryption method, e.g., Data Encryption Standard (DES) and/or International Data Encryption Algorithm(IDEA). The session key is then encrypted, in turn, in each case using the public key of the receiver (a plurality of receivers may be involved) and using a predefined asymmetric or public key method, e.g., Rivest, Shamir, Adleman code (RSA) and/or ElGamal (a public key encryption algorithm). The session key encrypted using this process is included with the encrypted message for each receiver. The reference "Cryptography and Network Security: Principles and Practice", by William Stallings, Prentice Hall, Upper Saddle River, N.J., 1998, appears discuss this procedure and the algorithms employed.

To decode a received message, the receiver must first decipher the session key using his/her private key, which belongs to his/her public key, and a preselected public key algorithm, to then decrypt the message using this session key.

Besides encrypting messages, cryptographic methods may also be used to encrypt stored data, e.g., on one's own personal computer. Here as well, one may employ a hybrid method, where the user first encrypts the data using a randomly selected symmetric key or session key and a predefined symmetric encryption method, e.g., DES and/or IDEA. The session key is then encrypted, in turn, using the user's public key and a preselected asymmetric or public key method, e.g., RSA and/or ElGamal.

Using his/her private key, which belongs to his/her public key, and the predefined public key algorithm, the user first encrypts the session key and then, using this session key, the stored data.

In the following, the term "encryption key" is used in each case to refer to the user's, i.e., the receiver's, private key.

The encryption key is either stored on a smart card, access to the smart card being protected by a personal identification number (PIN) known only to the user, or it is stored on another storage medium (for example, a hard disk or diskette), in which case it is preferably protected by a long password.

It can happen that the encryption key is lost. For example, if the storage medium where it was located is destroyed, or if the user forgets the PIN number or the password which he/she used to secure the encryption key, then it is no longer possible to use it to access the encrypted data.

To be able to make encrypted data accessible again in the event the encryption key is lost, mechanisms are needed to enable the encryption key to be regenerated in a secure manner. For this purpose, the encryption key is typically generated nowadays at a trust center or trustee or confidential, central location and securely stored. As a rule, the encryption key is produced by initially generating a large random number (seed) using a statistically valid random process. From this random number, the key pair made up of the public key/private key is then generated with the aid of a deterministic method. This seed is subsequently deleted. If necessary, a copy of his/her encryption key is then delivered to the user for use.

In the process, the user does not have any influence on how his/her encryption key is generated and stored. Moreover, it is expensive to transport the generated encryption key to the user in a secure manner. As a transport medium, nowadays, one uses, for example, the above-mentioned smart card, which is sent to the user. Further, there is a danger of misuse of the stored key by the trust center, or one's own key becoming publicly known due to a malfunction by the trust center and/or in the procedure.

SUMMARY OF THE INVENTION

Exemplary embodiments of the present invention are directed to providing a method of the type mentioned at the outset which may leave it solely up to the user to decide whether an encryption key should be reconstructed.

Exemplary embodiments of the present invention are further directed to eliminating a need for storing the encryption key for security purposes at the trust center by effecting that when the seed (S) is only generated on the user side, in that quantities (u) known only to the user are consulted; that regeneration information (R), which is suitable for regenerating the seed and from which the seed is able to be derived deterministically by the trust center by linking only to (or concatenating or combining with) information (v) known to it, is generated on the user side and is stored so as to be secured against lost; and that, in the event of loss of encryption key (C), seed (S) is reconstructed by the trust center by linking regeneration information (R) to secret information (v).

This may be implemented in exemplary embodiments of the present invention in that a mathematical mapping (key agreement mapping) k:

$k(x,y)=z$ is provided, for which it holds that:
a) $k(k(u,v),w)=k(k(u,w),v)$ for all $u,v,w$;
b) from the knowledge of $u$ and $k(u,v)$, in practice, one cannot infer $v$;
c) from the knowledge of $u$, $k(u,v)$ and $k(u,w)$, in practice, one cannot infer $k(k(u,w)v)$;

that a public parameter $g$ known to the trust center and a secret key $v$ available at the trust center are linked to a public key $V=k(g,v)$ of the trust center;

that public key $V$ and a random number $u$ selected on the user side are linked on the user side to seed $S=k(V,u)$; that a key pair made up of encryption key $C$ and public user key $U$ is derived from seed $S$ on the user side using the predefined deterministic method; and that to render possible the reconstruction of this key pair $U$ and $C$, regeneration information $R=k(g,u)$ is generated on the user side and is stored so as to be protected against loss.

In a further exemplary embodiment of the present invention, once regeneration information R is generated, random number u and seed S should again be destroyed for security reasons. Regeneration information R may be generated under tap-proof conditions, for example, within the user-side computer terminal, so that there is no chance of random number u or of seed S falling into the hands of the public. Without knowledge of secret key v, regeneration information R, by itself, may not be suitable for deciphering messages and data and, therefore, does not need to be kept secret.

Regeneration information R may be stored at any location, for example, on paper, and then when needed be sent or transmitted over any tappable route, for example, mail, e-mail, www or internet, ftp, etc., to the trust center.

Examples of suitable key agreement mappings k include those available from the theory of numbers. Provision may be made, for example, for key agreement mapping k to be a discrete exponential function modulo a large prime number p: $k(x,y):=x^y$ modulo p, and for public parameter g to be an element of a mathematical field GF(p) of a high multiplicative power, or for key agreement mapping k to be the multiplication on an elliptic curve. In practice, in a further exemplary embodiment of the present invention, one should select the order of magnitude of the numbers used such that, even by summoning up modern technical means, it may be impossible to calculate value y from values x and k(x,y), which, presupposing today's deciphering technology, is ensured at orders of magnitude of the prime numbers used of between 500 and 1000 bits.

The reference "Cryptography and Network Security: Principles and Practice", by William Stallings, Prentice Hall, Upper Saddle River, N.J., 1998, appears to discuss such formulations, including the Diffie-Hellman key exchange principle.

The present invention makes use of the Diffie-Hellman key exchange principle. Exemplary embodiments of the method of the present invention presupposes a trust center, which, if needed, is able to regenerate encryption key C with the aid of regeneration information R.

In further exemplary embodiments of the present invention, to reconstruct encryption key C in the event of a loss, seed $S=k(R,v)$ may be calculated by the trust center from regeneration information R. The lost encryption key C is, itself, able to be calculated from the thus reconstructed seed S using the deterministic method.

Due to the property of mapping k which is used, it holds that $k(R,v)=k(k(g,u),v)=k(k(g,v),u)=k(V,u)=S$, which actually corresponds, again, to original seed S. Since the deterministic method may be available to be known to the trust center, using regeneration information R, the trust center can be able to readily reproduce encryption key C, even without knowledge of random number u. The regenerated encryption key C should then be relayed to the user over a tap-proof channel or route.

In a further exemplary embodiment of the present invention, to prevent the method of the present invention from being misused to obtain private encryption keys C belonging to others, provision may also be made, once seed S is calculated and the user's new public key U and the new encryption key C are derived due to the loss of a key, for the trust center to verify whether the newly calculated public key U is identical to the user's original public key U, and for reconstructed encryption key C to only be handed over to the user when this verification is conclusive. A method for securely linking the user's identity to his/her public key U is available by ITU standard X.509.

A further exemplary embodiment of the present invention is directed to providing for there to be a plurality of trust centers which employ key agreement mapping k and public parameter g. In generating encryption key C, one or more of these trust centers may be selected, with the aid of each of the selected trust centers, another fraction value Sv of the seed being generated on the user side, as described, and partial seed Sv being linked on the user side to seed S. To regenerate encryption key C in the case of loss, the selected trust centers may calculate their respective fraction value Sv of seed S using regeneration information R. To reconstruct encryption key C, the reconstructed fraction values Sv are linked, in combination with one another, to seed S. The procedure can prevent a trust center from misusing the method, since each trust center is able to generate only one partial seed Sv which, by itself, is unusable.

A further embodiment of the present invention is directed to providing for the various trust centers to use different functions kv and/or different public parameters gv, and for separate regeneration information Rv to be created for each of the selected trust centers. In such a case, the user must implement the method of the present invention for each trust center, and each trust center must generate its particular partial seed Sv using its specific regeneration information Rv.

DETAILED DESCRIPTION

Figure 1:
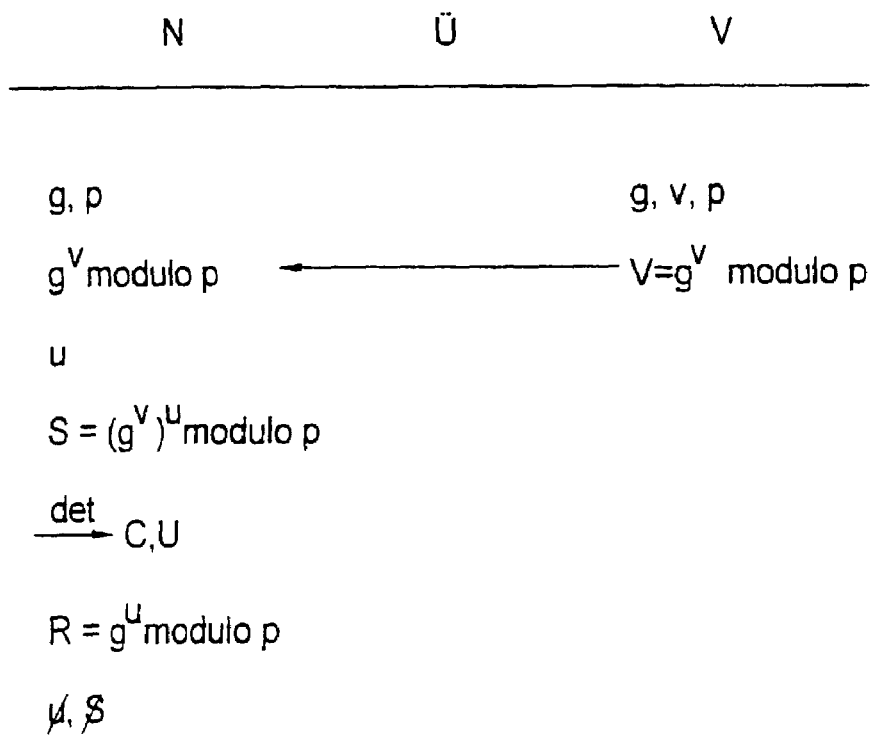
FIG. 1 shows a flow chart for generating a key part specific to a user.

FIG. 1 shows a time-related flow chart of the processes required for generating a reconstructable, user-specific encryption key C and public user key U in accordance with the method of the present invention. In the column denoted by N, the user-side data occurring one after another are listed from top to bottom. U designates the data transmission link to a trust center V. Trust center V and user N have public parameter g and large prime number p. Public key $V=g^v$ modulo p is generated by trust center V and transmitted by simple channels or means to user N. In response thereto, the user, using a random number u that he/she selects, generates a seed S and regeneration information R and again erases random number u for security reasons. Regeneration information G is transmitted to trust center V. By applying a predefined deterministic method known to the user and the trust center, a public user key U, as well as a private, likewise user-specific encryption key C is generated from seed S. Encryption key C is used here for decrypting messages or data from the user.

Figure 2:
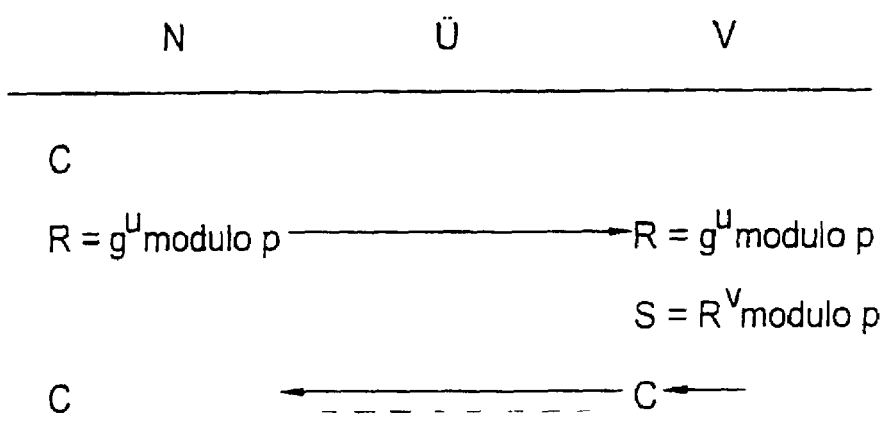
FIG. 2 shows a flow chart for reconstructing the encryption key, following a loss.

In the case that the encryption key is lost, the trust center, as shown in FIG. 2, regenerates seed S and encryption key C from regeneration information R, transmitted by the user to the trust center, by linking to secret key v and communicates it by secure channels or other such means to the user.

What is claimed is:

1. A method for at least one of generating and regenerating an encryption key for a cryptographic method, comprising:

generating a seed S, the seed S being a large random number, only on a side of a user by consulting at least one quantity u known only to the user, the encryption key C and a public key U being generated from the seed S by using at least one predefined deterministic method;

generating a regeneration information R on the side of the user to regenerate the seed S and from which the seed S may be derived deterministically by a trust center by linking only to a secret information v known to the trust center;

storing the regeneration information R so that the regeneration information R is secured against loss, wherein if the encryption key C is unavailable then the seed S is reconstructable by the trust center by linking the regeneration information to the secret information v.

2. The method of claim 1, further comprising providing a key agreement mapping k(): k(a value x, a value y)=a value z, and wherein:

a) k(k(u,v),w)=k(k(u,w),v) for all u,v,w;
b) from the knowledge of u and k(u,v), v cannot be inferred;
c) from the knowledge of u, k(u,v) and k(u,w), k(k(u,w),v) cannot be inferred;

wherein a public parameter g known to the trust center and a secret key v available at the trust center are linked to a public key V where V equals k(g,v), of the trust center;

wherein the public key V and the at least one quantity u selected on the user side are linked on the user side to the seed S, where S equals k(V,u);

wherein a key pair made up of an encryption key C and a public user key U is derived from seed S on the user side using the at least one predefined deterministic method; and wherein to reconstruct the key pair of the encryption key C and the public user key U, the regeneration information R, where R equals k(g,u), is generated on the user side and is stored so as to be protected against loss.

3. The method of claim 1, further comprising providing a key agreement mapping k which is a discrete exponential function modulo a large prime number p: $k(x,y) := x^y$ modulo p, and providing that a public parameter g is an element of a mathematical field GF(p) of a high multiplicative power.

4. The method of claim 1, further comprising providing a key agreement mapping k which is a multiplication on an elliptic curve.

5. The method of claim 1, wherein the trust center calculates the seed S, where S equals (R,v), from the regeneration information R so as to reconstruct the encryption key C.

6. The method of claim 1, further comprising deriving a new public key U and a new encryption key C when the seed S is calculated, due to loss of at least one of the encryption key C and the public key U; and verifying by the trust center whether the new public key U is identical to the prior public key U, wherein when verified that the new public key U is identical to the prior public key U then providing a reconstructed encryption key C to the user.

7. The method of claim 2, further comprising providing a plurality of trust centers which employ the key agreement mapping k and the public parameter g;

selecting at least one of the plurality of trust centers, so that each of the selected trust centers assist in generating a partial seed Sv of the seed S being generated on the side of the user and the partial seed Sv being linked on the side of the user to the seed S, in generating the encryption key C;

calculating by the selected trust centers their respective partial seed Sv of the seed S using the regeneration information R, to regenerate the encryption key C in the case of loss;

reconstructing the encryption key C by linking in combination with each other the respective reconstructed partial seed Sv of each respective selected trust center.

8. The method of claim 7, wherein the trust center and the plurality of trust centers each use at least one of a respective different function kv and a respective different public parameter gv to create a separate regeneration information Rv for each of the trust centers selected.

* * * * *